United States Patent [19]

Ostertag

[11] Patent Number: 5,292,291
[45] Date of Patent: Mar. 8, 1994

[54] PARALLEL-AXIS GEAR DIFFERENTIAL WITH EXTENDED PLANET GEARS

[75] Inventor: Steven E. Ostertag, Rochester, N.Y.
[73] Assignee: Zexel-Gleason USA, Inc., Rochester, N.Y.
[21] Appl. No.: 890,565
[22] Filed: May 28, 1992
[51] Int. Cl.$^5$ .......................................... F16H 1/42
[52] U.S. Cl. ................................................ 475/252
[58] Field of Search ............ 74/665 K; 475/248, 252, 475/338, 226, 227; 180/248

[56] References Cited

U.S. PATENT DOCUMENTS

| | | | |
|---|---|---|---|
| 1,195,314 | 8/1916 | Williams | 475/227 |
| 1,938,649 | 12/1933 | Welsh | 475/252 X |
| 2,269,734 | 1/1942 | Powell | 475/252 |
| 2,651,215 | 9/1953 | Schoenrock | 475/249 |
| 2,789,446 | 4/1957 | Schoenrock | 475/252 X |
| 2,972,265 | 2/1961 | Walter | 475/226 |
| 3,095,761 | 7/1963 | Hilado | 475/252 |
| 3,154,969 | 11/1964 | Saari | 475/227 |
| 3,251,244 | 5/1966 | Nickell | 475/252 x |
| 3,494,226 | 2/1970 | Biddle | 475/249 |
| 3,706,239 | 12/1972 | Myers | 475/226 |
| 4,245,524 | 1/1981 | Dammon | 475/252 X |
| 4,365,524 | 12/1982 | Dissett et al. | 475/226 |
| 4,491,035 | 1/1985 | Gleasman et al. | 475/227 |
| 4,491,036 | 1/1985 | Stritzel | 475/227 |
| 4,495,835 | 1/1985 | Gleasman | 475/227 |
| 4,512,211 | 4/1985 | Stritzel | 475/227 |
| 4,677,876 | 7/1987 | Dissett | 475/226 |
| 4,890,511 | 1/1990 | Pedersen | 475/227 X |
| 4,969,532 | 11/1990 | Oyama et al. | 180/248 X |
| 5,055,096 | 10/1991 | Riemschied et al. | 475/252 X |
| 5,122,101 | 6/1992 | Tseng | 475/252 |
| 5,169,370 | 12/1992 | Dye et al. | 475/226 X |

FOREIGN PATENT DOCUMENTS

| | | |
|---|---|---|
| 0130806 | 1/1985 | European Pat. Off. . |
| 388207 | 9/1990 | European Pat. Off. ............ 475/341 |
| 482754A1 | 4/1992 | European Pat. Off. . |
| 4013196 | 10/1991 | Fed. Rep. of Germany . |
| 4013201 | 10/1991 | Fed. Rep. of Germany . |
| 2615262 | 11/1988 | France . |
| 59-97346 | of 1984 | Japan . |
| WO86/04127 | 7/1986 | PCT Int'l Appl. ................. 475/226 |
| 2234791 | 2/1991 | United Kingdom . |

Primary Examiner—Dirk Wright
Attorney, Agent, or Firm—Eugene Stephens & Associates

[57] ABSTRACT

A parallel-axis gear differential includes pairs of combination gears (66 and 68) mounted within pockets (76 and 78) formed in a differential housing (10, 12). Each combination gear includes a first gear section (70) for meshing with one of two side gears (58 or 60), a second gear section (72) for meshing with the first gear section of its mating combination gear, and a stem section (74) interconnecting the first two gear sections. Each pocket includes two bearing portions (84 and 86) for rotationally supporting the gear sections (70 and 72) and an intermediate portion (88) providing clearance for the stem sections (74). Windows (90) are formed through an exterior (92, 94) of the housing as passageways connecting the exterior of the housing to the intermediate portions (88). A spacing block (50) separates the side gears (58 and 60) through a distance approximately equal to an amount of overlap between the stem sections (74) of the combination gear pairs.

22 Claims, 3 Drawing Sheets

PARALLEL-AXIS GEAR DIFFERENTIAL WITH EXTENDED PLANET GEARS

TECHNICAL FIELD

The invention relates to automotive differentials having planetary gear arrangements that are mounted in a housing for connecting an input drive shaft to a pair of output drive shafts.

BACKGROUND

Gear differentials include compound planetary gear sets carried within a differential housing interconnecting a pair of output shafts for opposite directions of rotation with respect to the housing. An input shaft is connected to the housing for rotating the housing about a common axis of the output shafts. Sun gear members of the respective planetary gear sets, also referred to as "side" gears, are coupled to inner ends of the output shafts. Planet gear members of the planetary gear sets, also referred to as "element" gears, operatively connect the two side gears for relative rotation in opposite directions.

One known arrangement of the planetary gearing positions the sun and planet gears within the housing for rotation about axes that extend parallel to each other. Differentials with this type of gearing arrangement are referred to as "parallel-axis" gear differentials. The planet gears of this type of differential are generally mounted in pairs within the differential housing. One portion of each planet gear meshes with one of the side gears, and another portion of each planet gear meshes with its paired planet gear.

The planet gears are individually supported for rotation on shafts or within pockets formed in the housings. The pockets provide bearings for slidably supporting outside cylinder surfaces of the planet gears including the top lands of the planet gear teeth. Alternatively, bores formed in the housing can be used to support opposite ends of the shafts.

Ordinarily, the planet gear pairs are evenly distributed about the central axis of the differential. The pockets supporting the element gears occupy most of the circumference of the housing, leaving little room between the pairs of pockets to form window passages through the housing to circulate lubricant or to gain access to the interior of the housing. In addition, the remaining portions of the housing between the pairs of pockets are important for preserving structural strength of the housing.

A commonly assigned copending U.S. patent application Ser. No. 735,821, filed Jul. 25, 1991, discloses an example of a parallel-axis gear differential in which the planet gears are formed as so-called "combination" gears having two gear sections separated by a stem. A first of the gear sections of each combination gear meshes with one of two side gears, and a second of the gear sections meshes with the first gear section of its paired combination gear. The two meshes between paired combination gears straddle the two meshes between the paired combination gears and the side gears.

The side gears, however, are positioned together between the straddled combination gear meshes, and this limits access to space between the side gears for fastening ends of the output shafts within the differential or for connecting a coaxial input shaft to the differential housing. In addition, relative sliding between the two side gears can produce different frictional effects between opposite directions of torque transfer through the differential housing (e.g. "drive" and "coast" directions). The opposite directions of torque transfer thrust the side gears either together or apart against opposite ends of the housing. The relative sliding velocity between the side gears is twice as great as the relative sliding velocity between either side gear and the housing.

SUMMARY OF INVENTION

My invention improves parallel-axis gear differentials by providing better access to the interior of their housings for such purposes as circulating lubricant, fastening output shafts within the housings, or connecting coaxial input shafts to the housings.

One example of my new parallel-axis gear differential includes a housing that is rotatable about a pair of output drive shafts. A pair of side gears is arranged to receive ends of the respective output shafts for rotation with the output shafts about a common axis. Three pairs of combination gears form respective gear trains interconnecting the side gears for opposite directions of relative rotation. Each combination gear includes a first gear section in meshing engagement with one of the side gears, a second gear section in meshing engagement with its paired combination gear, and a stem section interconnecting the first and second gear sections.

Three pairs of pockets are formed in the housing supporting the combination gears for rotation about axes that extend parallel to the common axis. Each of the pockets includes a first bearing portion rotatively supporting the first gear section, a second bearing portion rotatively supporting the second gear section, and an intermediate portion providing clearance for the stem section. A window is formed as a passageway in the housing connecting an exterior of the housing to the intermediate portion of the pockets for providing access to an interior of the housing.

The intermediate portions of each pair of pockets overlap each other along the common axis through a first distance that corresponds to a second distance through which the side gears are separated from one another. The stem sections of the combination gears extend through a third distance that is approximately equal to the sum of a face width of one of the side gears and either of the first and second distances. The window is dimensioned in length along the common axis through a fourth distance that also corresponds to the first and second distances.

Another example of my invention includes a similar differential assembly having stem sections of the combination gears overlapping through a first distance along the common axis. The side gears are spaced apart through the same distance. A driving block is mounted in the housing between the side gears for connecting a coaxial input shaft to the housing. An inner portion of the driving block is keyed to the input shaft and an outer portion of the same block is keyed to the housing.

DRAWINGS

DETAILED DESCRIPTION

Figure 1:
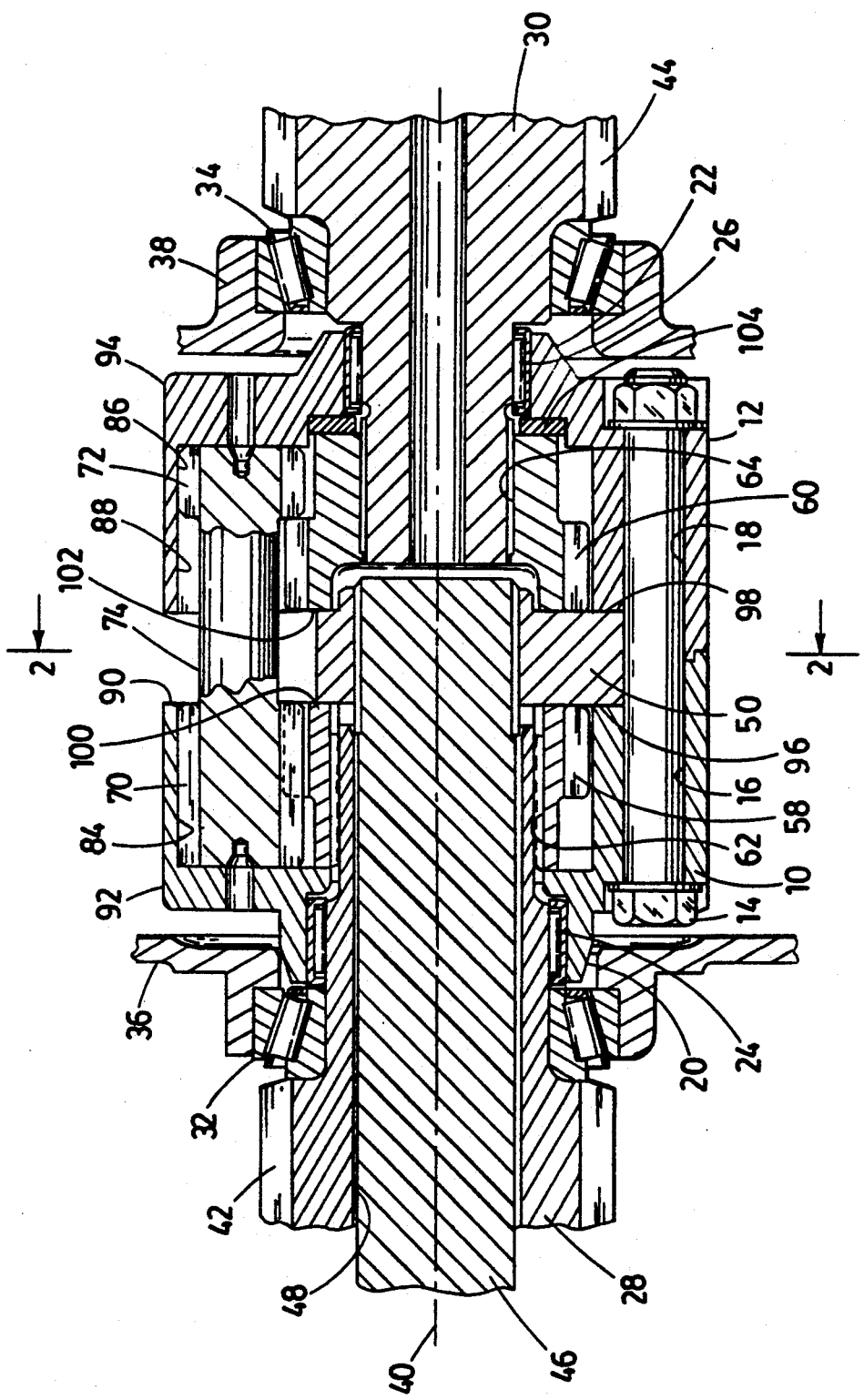
FIG. 1 is a longitudinal sectional view of one example of my differential interconnecting an input drive shaft to two output drive shafts.
Figure 2:
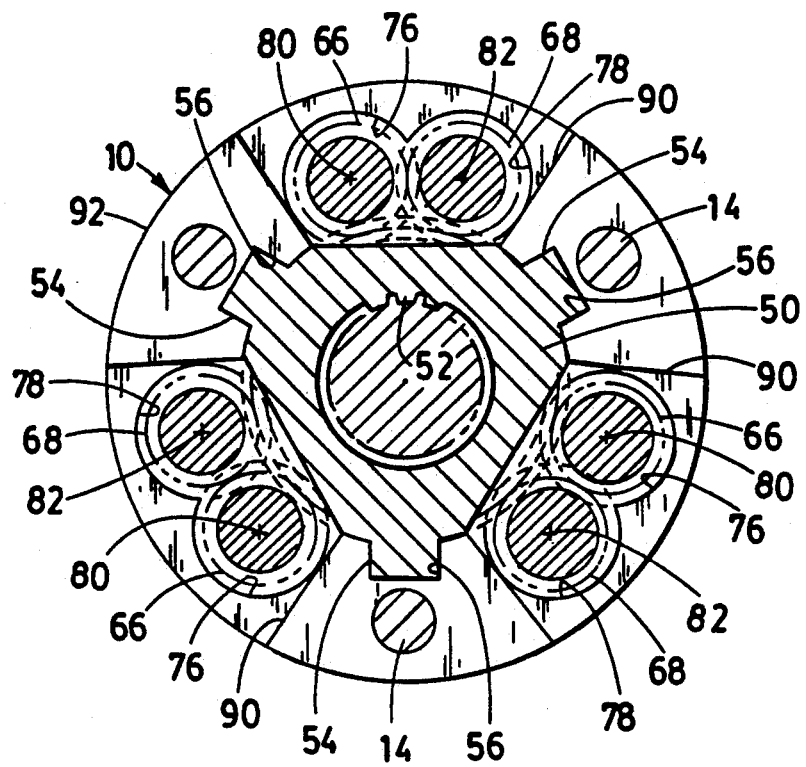
FIG. 2 is a traverse sectional view taken along line 2—2 of FIG. 1 showing an end view of one of two housing halves.
Figure 3:
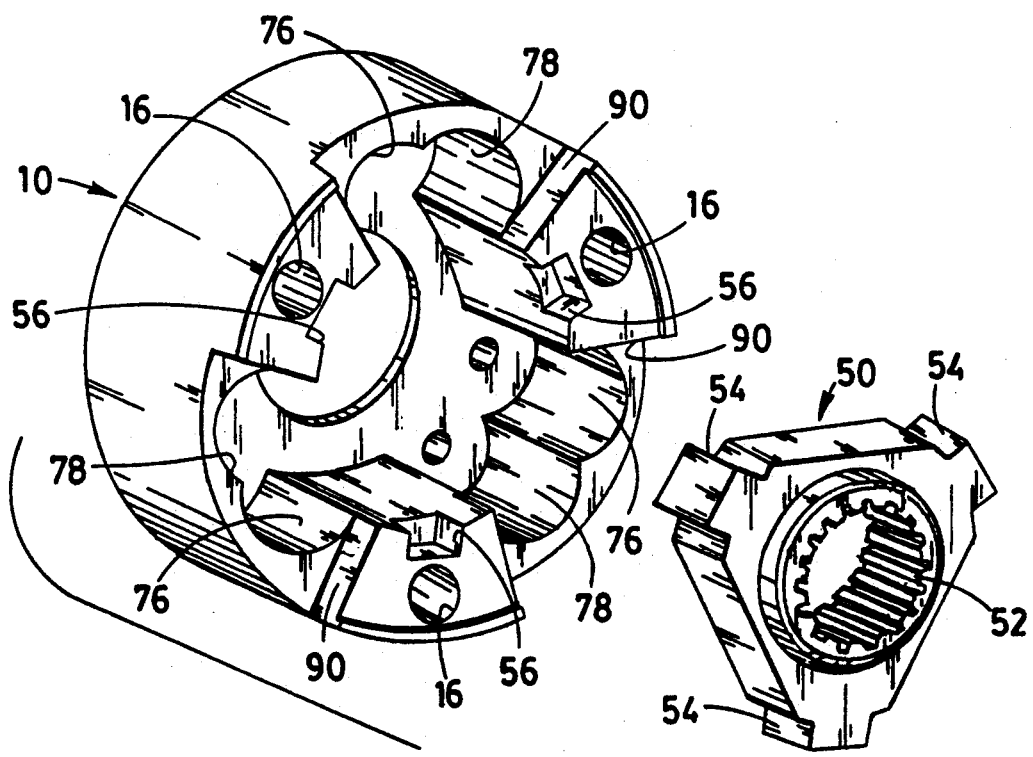
FIG. 3 is an exploded view of the one housing half and a driving block also shown in FIG. 2.

In the embodiment of FIGS. 1-3, my differential is constructed as a center differential for delivering drive power to front and rear axles of a vehicle. The center differential is assembled from two housing halves 10 and 12 that are held together by bolts 14 extending through respective bores 16 and 18 in the two housing halves 10 and 12.

Trunnions 20 and 22, also formed in the respective housing halves 10 and 12, carry bearings 24 and 26 for mounting the housing halves about output shafts 28 and 30. Separate bearings 32 and 34 carried by chassis supports 36 and 38 mount the respective output shafts 28 and 30 for rotation about a common axis 40. Toothed portions 42 and 44 are formed in the respective output shafts 28 and 30 for delivering drive power to front and rear axles (not shown).

An input shaft 46 extends through a bore 48 in output shaft 28 for connecting the housing halves 10 and 12 to a source of drive power (not shown). An inner end of the input shaft 46 is keyed to an inner portion of driving block 50 by mating splines 52. Keys 54, shown in FIGS. 2 and 3, project from an outer portion of the driving block 50 for engaging mating keyways 56 formed in adjacent portions of the housing halves 10 and 12. In addition to delivering drive power to the housing halves 10 and 12, the keys 54 and mating keyways 56 align the housing halves in desired relative angular positions about the common axis 40.

Side gears 58 and 60, which are preferably helical gears, are keyed to inner ends of the respective output shafts 28 and 30 by splines 62 and 64. Three pairs of combination gears 66 and 68 are mounted in mesh about the side gears 58 and 60 in equal angular positions about the common axis 40. Each of the combination gears 66 and 68 includes a first gear section 70 in mesh with one of the side gears, a second gear section 72 in mesh with the first gear section 70 of its paired combination gear, and a stem section 74 interconnecting the first and second gear sections 70 and 72. Further description of this type of combination gear can be found in commonly assigned copending U.S. patent application Ser. No. 735,821, filed Jul. 25, 1991; and this application is hereby incorporated by reference for all of its relevant description.

Three pairs of pockets 76 and 78 are also formed in the housing halves 10 and 12 for rotationally supporting the combination gears 66 and 68 about respective axes 80 and 82 that extend parallel to the common axis 40. Each of the pockets includes a first bearing portion 84 for rotationally supporting the first gear sections 70, a second bearing portion 84 for rotationally supporting the second gear sections 72, and an intermediate portion 88 providing clearance for the stem sections 74.

Both the stem sections 74 of the pairs of combination gears and the intermediate portions 88 of the pairs of pockets overlap each other through a distance along the common axis 40. The side gears 58 and 60 are spaced apart along the common axis by the driving block 50 through substantially the same distance. The stem sections 74 of each combination gear extend in length through a distance substantially equal to the sum of the spacing between side gears and a face width of the side gear in mesh with its paired combination gear. These design restraints permit the driving block 50 to be positioned between the side gears while adding a minimum of additional length to the combination gears.

Three windows 90 are formed through respective exterior surfaces 92 and 94 of the housing halves 10 and 12, constituting passages connecting the intermediate portions 88 of the pockets to the exterior surfaces 92 and 94. The windows 90 allow for improved circulation of lubricant from an exterior sump (not shown) to bearing supports and meshes of the side and combination gears. The windows 90 can be sized to a maximum length in the direction of the common axis 40 equal to the distance through which the intermediate portions 88 of the pairs of pockets overlap each other, without diminishing areas over which the first and second bearing portions 84 and 86 are effective for rotationally supporting the gear sections of the combination gears. In addition, the windows 90 can be dimensioned in circumference about the common axis 40 through a combined angular spacing of the pairs of pockets 76 and 78, without adversely weakening housing strength.

The driving block 50 has opposite side surfaces 96 and 98 for resisting end thrust from the side gears 58 and 60. Relative rotational speed between each of the side gears and the driving block is equal to one-half of the relative rotational speed between the side gears. This reduces the amount of heat generated at respective inner end faces 100 and 102 of the side gears 58 and 60.

In addition, the driving block 50 allows the coefficient of friction between the respective inner end faces 100 and 102 of the side gears and the opposite side surfaces 96 and 98 of the driving block to be controlled independently of the coefficient of friction between the inner end faces of the side gears alone. For example, the coefficient of friction between the driving block and side gears can be either the same as or different from the coefficient of friction between the side gears and the respective housing halves (notwithstanding effects of thrust washer 104, which is regarded as either a part of side gear 60 or housing half 12).

Figure 4:
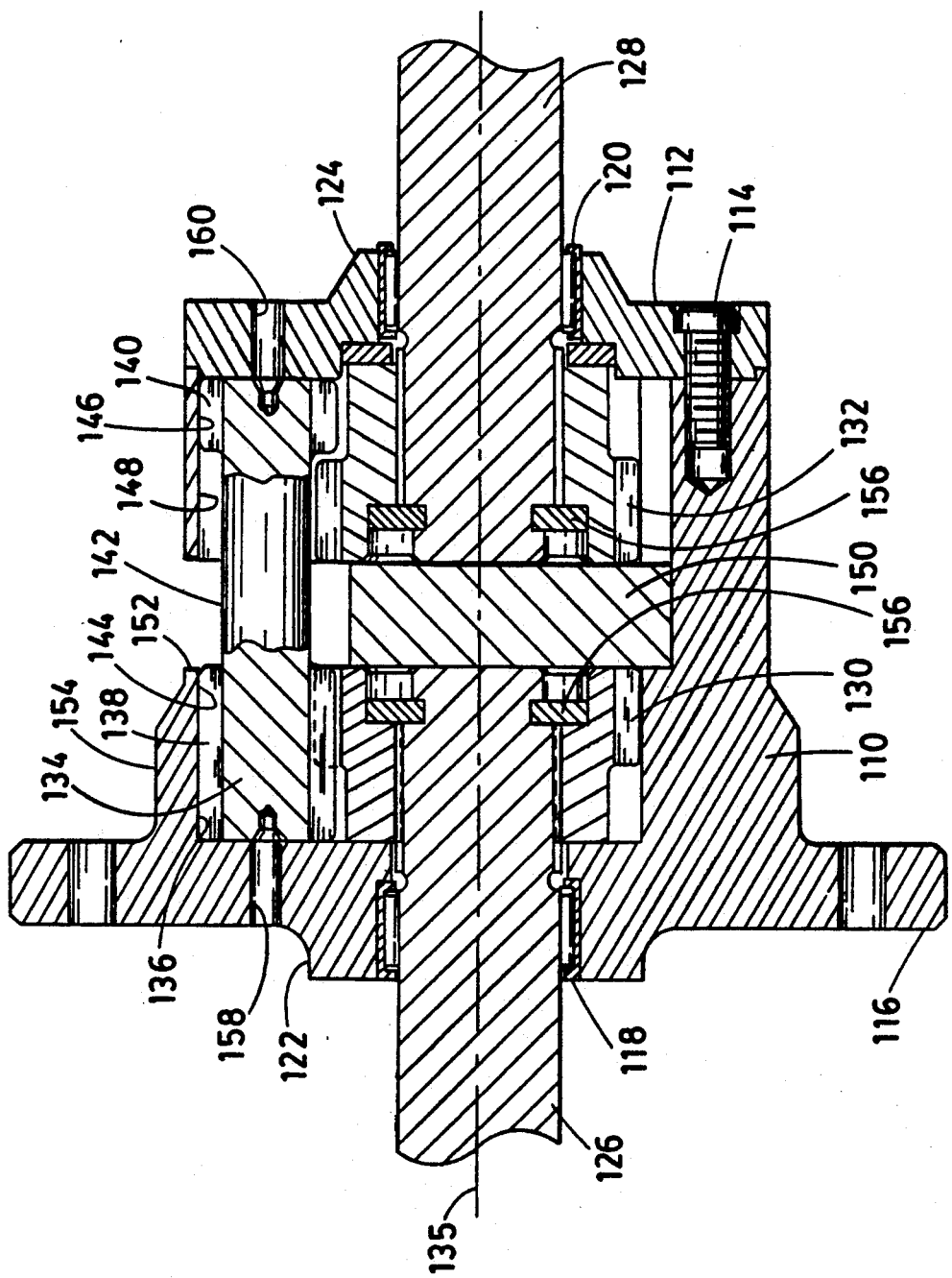
FIG. 4 is a longitudinal sectional view of another example of my differential arranged for fastening two output drive shafts within a housing.

A second embodiment of my invention is illustrated in FIG. 4 as a front or rear differential for dividing drive power between front or rear drive axle halves. A housing 110 is fitted with an end cap 112, and the housing 110 and end cap 112 are secured together by bolts 114. A flange 116 is formed integrally With the housing 110 for mounting a ring gear (not shown). Bearings 118 and 120, which are mounted within respective trunnions 122 and 124, support the housing for rotation about axle shafts 126 and 128.

A planetary gear arrangement similar to the preceding embodiment is carried in the housing 110. For example, side gears 130 and 132 are splined to inner ends of the axle shafts 126 and 128 for rotation about a common axis 135. Combination gears 134 are mounted in respective pairs of pockets 136 that are evenly distributed about the periphery of the side gears. Each combination gear 134 includes a first gear section 138 for meshing with one of the side gears, a second gear section 140 for meshing with the first gear section 138 of its paired combination gear, and a stem section 142 interconnecting the two gear sections 138 and 140.

The pockets are also divided into separate portions corresponding to the three sections of the combination gears. For example, each pocket 136 includes a first bearing portion 144 for rotationally supporting the first gear sections 138, a second bearing portion 146 for rotationally supporting the second gear sections 140, and an intermediate portion 148 providing clearance for the stem sections 142.

The side gears 130 and 132 are separated along the common axis of rotation 135 by a removable spacing block 150 through a distance that substantially corresponds to an amount of overlap between the stem sections 142 of the combination gear pairs. Although the spacing block 150 is depicted with a particular design, a variety of other designs of spacing blocks could also be used including spacing blocks disclosed in U.S. Pat. Nos. 3,494,226; 4,365,524; 4,495,835; and 4,677,876.

The intermediate portions 148 of each pair of pockets 136 also overlap in a direction along the common axis through substantially the same distance overlapped by the stem sections 142. Windows 152 are formed through this overlapping space in the housing connecting an exterior 154 of the housing to the intermediate portions 148. The windows 152 are dimensioned to permit insertion and removal of the spacing block 150 (upon removal of a pair of combination gears) to provide access to removable locking elements 156 formed as so-called "C-lock" washers on inner ends of the axle shafts 126 and 128. The locking elements 156 capture the ends of the axle shafts within recesses 158 formed in the side gears 130 and 132 and can be installed or removed through the windows 152.

The windows 152 also cooperate with passages 158 and 160 that are respectively formed through a flange end of the housing 110 and through end cap 112 for circulating lubricant through the pockets 136. Gear meshes between the combination gears 134 and side gears 130 and 132 help to further circulate the lubricant to interior portions of the housing.

I claim:

1. A differential gear assembly comprising:
   a housing rotatable about a pair of drive shafts sharing a common axis of rotation;
   a pair of side gears positioned in said housing for receiving ends of the respective drive shafts for rotation therewith about the common axis;
   at least one pair of combination gears positioned in said housing operatively connecting said pair of side gears for opposite directions of relative rotation;
   each of said combination gears having a first gear section in meshing engagement with one of said side gears, a second gear section in meshing engagement with its paired combination gear, and a stem section interconnecting said first and second gear sections;
   at least one pair of pockets formed in said housing supporting said combination gears for rotation about respective axes that extend parallel to the common axis;
   each of said pockets having a first bearing portion rotatively supporting said first gear section, a second bearing portion rotatively supporting said second gear section, and an intermediate portion providing clearance for said stem section;
   at least one window forming a passageway through an exterior of said housing connecting the housing exterior to said intermediate portion of the pockets;
   said intermediate portion of one pocket of said pair of pockets being aligned with said intermediate portion of the other pocket of said pair of pockets through a first distance along the common axis; and
   said window passageway connecting the housing exterior to both intermediate portions of said pair of pockets.

2. The assembly of claim 1 in which said side gears are spaced apart along the same portion of the common axis through which the intermediate portions of the pockets are aligned.

3. The assembly of claim 2 in which said side gears are spaced apart through a second distance that is approximately equal to said first distance through which the intermediate portions of the pockets are aligned.

4. The assembly of claim 3 in which each of said side gears has a predetermined face width, and said stem sections of the combination gears extend through a third distance that is approximately equal to a sum of said predetermined face width of one of the side gears and said second distance through which the side gears are spaced apart.

5. The assembly of claim 1 in which said window forms a space along the same portion of the common axis through which the intermediate portions of the pockets are aligned.

6. The assembly of claim 5 in which said window is dimensioned in length in a direction along the common axis not greater than said first distance through which the intermediate portions of the pockets are aligned.

7. The assembly of claim 6 in which said length of the window passage is nearly equal to said first distance through which the intermediate portions of the pockets are aligned.

8. The assembly of claim 2 in which said side gears are separated by a spacing block.

9. The assembly of claim 8 in which said side gears a recessed for receiving locking elements that capture the respective ends of the pair of drive shafts within said housing.

10. The assembly of claim 8 in which said spacing block is adapted for coupling an input drive shaft to said housing for rotating said housing together with the input drive shaft about the common axis.

11. The assembly of claim 10 in which said spacing block includes inner and outer portions, said inner portion being arranged to receive an end of the input shaft and said outer portion being connected to said housing.

12. The assembly of claim 11 in which said outer portion of the spacing block is keyed to said housing.

13. A parallel-axis gear differential comprising:
   a housing rotatable about a pair of drive shafts sharing a common axis of rotation;
   a pair of side gears adapted to receive ends of the respective drive shafts for rotation therewith about the common axis;
   at least one pair of combination gears mounted in said housing for rotation about respective axes that extend parallel to the common axis;
   each of said combination gears including a first gear section in meshing engagement with one of said side gears, a second gear section in meshing engagement with its paired combination gear, and a stem section interconnecting said first and second gear sections;
   at least one pair of pockets formed in said housing enclosing said combination gears;
   each of said pockets having first and second portions enclosing said first and second gear sections of the combination gears and an intermediate portion enclosing said stem section of the combination gears;

said stem sections of the combination gears overlapping in length through a first distance along a portion of the common axis;

said side gears being spaced apart along the same portion of the common axis through a second distance that is approximately equal to said first distance through which the stem sections overlap each other;

said intermediate portions of the pockets overlapping in length along the same portion of the common axis through a third distance that is approximately equal to said first and second distances; and a driving block mounted in said housing between said side gears for coupling an input drive shaft to said housing for rotating said housing together with the input drive shaft about the common axis.

14. The differential of claim 13 in which said driving block includes inner and outer portions; said inner portion being arranged to receive an end of the input shaft and said outer portion being connected to said housing.

15. The differential of claim 14 in which said outer portion of the driving block is keyed to said housing.

16. The differential of claim 15 in which said housing includes two halves that are keyed together by said driving block.

17. The differential of claim 13 in which said side gears include inner and outer faces, said inner faces of the side gears together with said driving block defining a first coefficient of friction, and said outer faces of the side gears together with said housing defining a second coefficient of friction.

18. The differential of claim 17 in which said first and second coefficients of friction are the same.

19. The differential of claim 17 in which said first and second coefficients of friction are different.

20. The differential of claim 13 in which at least one window is formed as a passageway through an exterior of said housing connecting the housing exterior to said intermediate portion of the pockets.

21. The differential of claim 20 in which said window connects the housing exterior to said intermediate portions of both pockets of said pair of pockets.

22. The differential of claim 21 in which said window forms a space along the same portion of the common axis through which both the stem sections of the combination gears and the intermediate portions of the pockets are aligned.

* * * * *